United States Patent [19]

Reimers et al.

[11] 3,709,352

[45] Jan. 9, 1973

[54] MULTIPLE PITCH PROCESSING CONVEYOR

[75] Inventors: James L. Reimers; Adil A. Mughannam, both of San Jose, Calif.

[73] Assignee: FMC Corporation, San Jose, Calif.

[22] Filed: Dec. 17, 1970

[21] Appl. No.: 99,183

[52] U.S. Cl. .................................................. 198/131
[51] Int. Cl. ............................................. B65g 17/00
[58] Field of Search.....198/131, 140, 179; 74/245 C, 74/250 C, 250, 251

[56] References Cited

UNITED STATES PATENTS

| | | | |
|---|---|---|---|
| 3,394,793 | 7/1968 | Reimers et al. | 198/131 |
| 3,137,391 | 6/1964 | Bucher | 209/84 |

Primary Examiner—Harvey C. Hornsby
Assistant Examiner—Douglas D. Watts
Attorney—F. W. Anderson and C. E. Tripp

[57] ABSTRACT

A multiple pitch conveyor for supporting elongated articulating carrier bars which are spaced different distances apart. Each carrier bar cooperates with the next adjacent carrier bar so as to confine a row of containers of one size range on one side thereof and to confine a row of containers of another size range on the other side thereof when passing through the heat treatment chamber of a cooker. The carrier bars are specifically designed to maintain positive container control and maximum container density per running foot of conveyor while permitting the cooker to handle at least two different size ranges of containers with the same or different commodities hermetically sealed therein.

13 Claims, 6 Drawing Figures

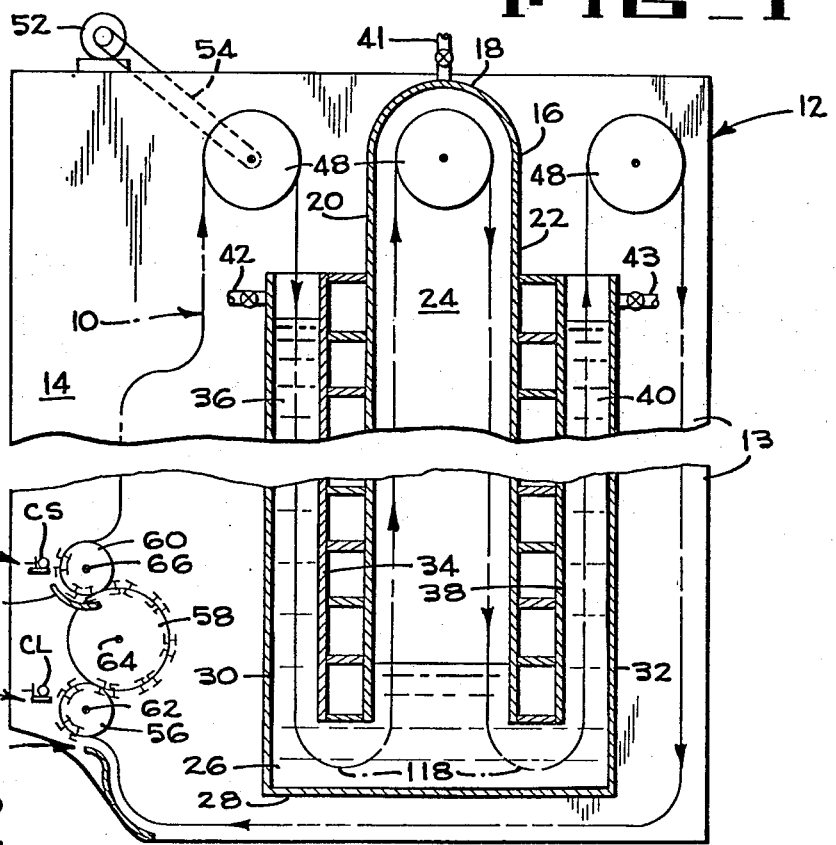
FIG_1
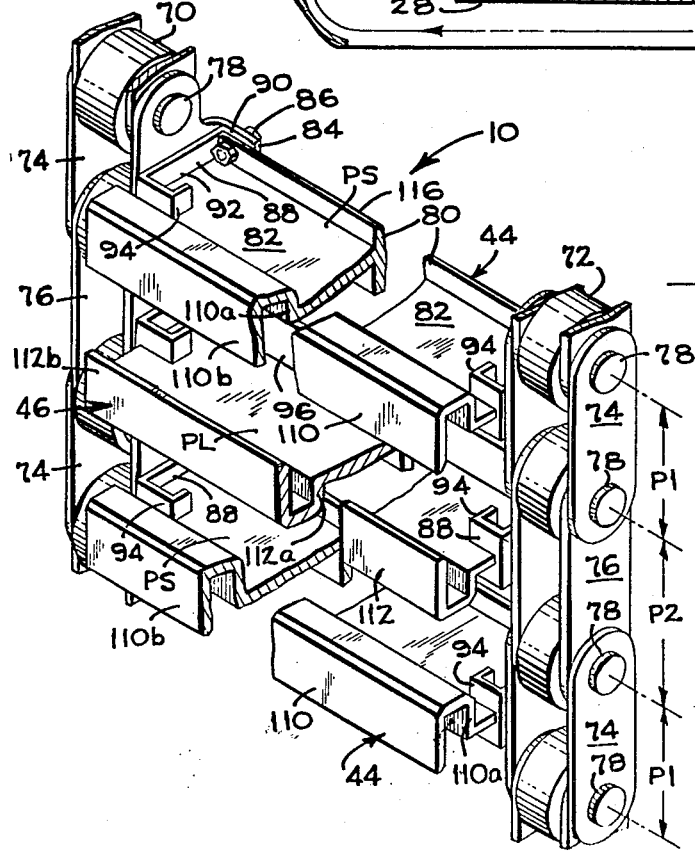
FIG_2
INVENTORS
JAMES L. REIMERS
ADIL A. MUGHANNAM
BY F.W. Anderson
C.E. Tripp
ATTORNEYS

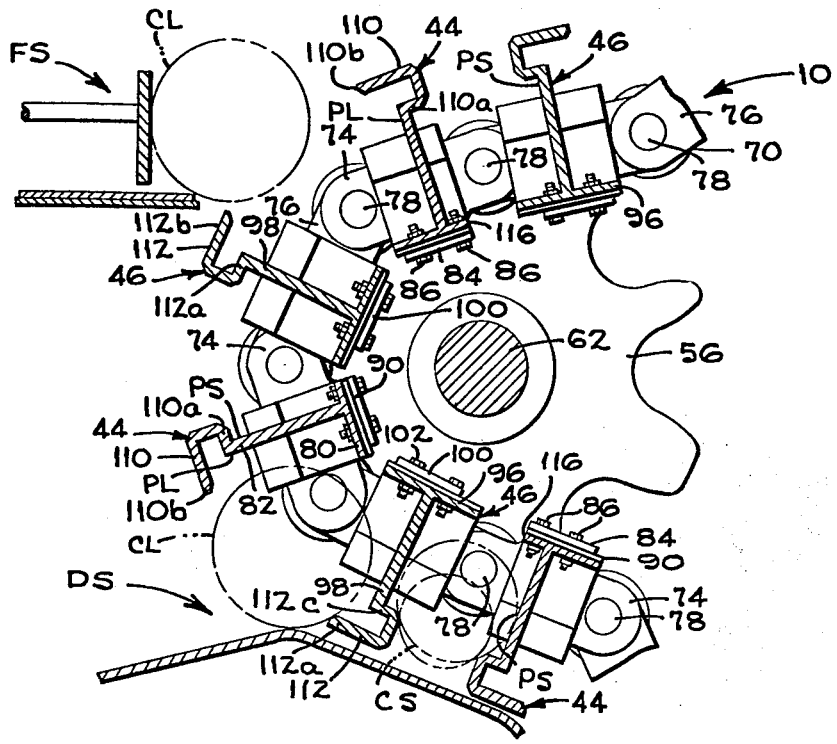
FIG_3
FIG_4

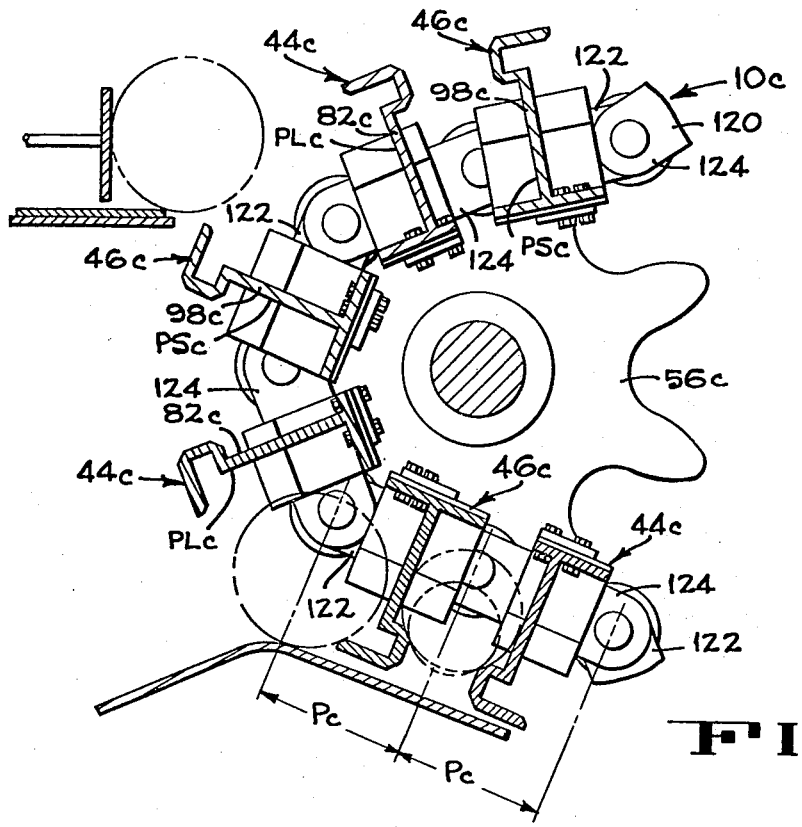
FIG_5
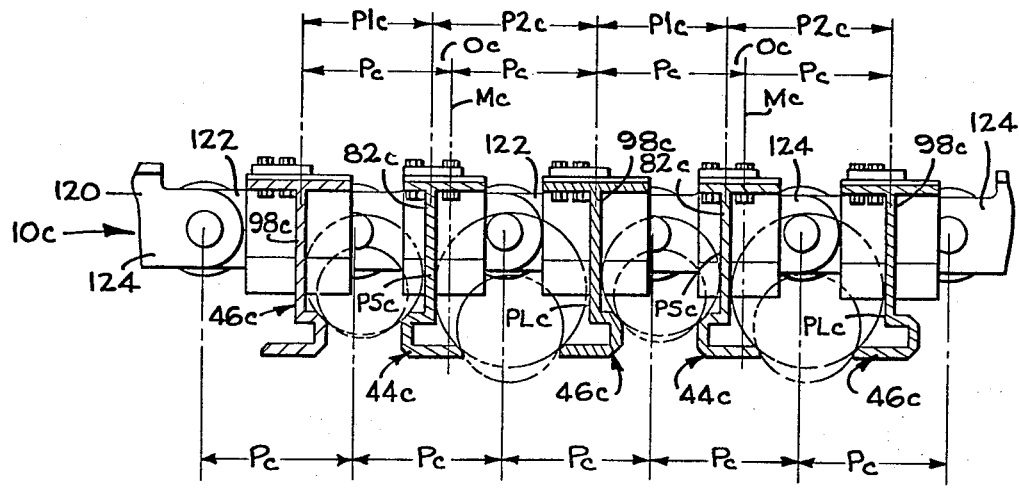
FIG_6

MULTIPLE PITCH PROCESSING CONVEYOR

CROSS REFERENCE TO RELATED APPLICATIONS

The multiple pitch processing conveyor of the present invention may be associated with a hydrostatic cooker having a multiple feed and discharge system of the type disclosed in application Ser. No. 785,174 to Smith et al. which application was filed on Dec. 19, 1968 and is assigned to the assignee of the present invention. The multiple pitch conveyor may also be used in the types of cookers disclosed in Reimers applications Ser. No. 660,281 filed on Aug. 14, 1967 and Ser. No. 787,647 filed on Dec. 30, 1968, which applications are assigned to the assignee of the present invention.

BACKGROUND OF THE INVENTION

1. Field of the Invention

This invention pertains to the cooker art and more particularly relates to a multiple pitch processing conveyor for handling rows of containers in at least two different size ranges and for maintaining maximum container density per running foot of conveyor.

2. Description of the Prior Art

Cookers of the type which use accommodating processing conveyors are usually rather expensive and are not too versatile. The aforementioned Smith et al application discloses a hydrostatic cooker having two spaced feed stations thereby permitting higher speeds of the processing conveyor and also permitting containers having one commodity sealed therein to be fed into the processing conveyor at one station, and containers having another type or grade of commodities therein to be fed into alternate carriers of the processing conveyor at the other feed station. However, since the pitch of the processing conveyor is equal throughout the entire length of the conveyor, all containers must lie within a single size range so as to enable the Smith carriers to maintain positive control over the rows of containers when they are passing through the processing chambers of the cooker. Also, because of the single pitch throughout the entire length of the conveyor, even if two or more different size ranges of containers were fed into special carriers, for example carriers having hinged covers or the like thereon to positively confine the rows therein, all of the carriers would necessarily be large enough to accommodate the largest containers and accordingly the conveyor pitch would necessarily be slightly larger than the largest size containers. Thus, if such carriers were used the density or number of rows of containers per linear foot would necessarily be less than a maximum.

SUMMARY OF THE INVENTION

The conveyor of the present invention represents an improvement over conveyors of the type shown in Reimers et al. U.S. Pat. No. 3,394,973, July 30, 1968.

The multiple pitch processing conveyor of the present invention is provided with row accommodating carrier bars which are spaced a different distance from and cooperate with their next adjacent carrier bars to accommodate rows of containers of considerably different size ranges. Since the web of each carrier bar is spaced a first distance or pitch from its next forward carrier, and a second distance or pitch from its next following carrier, and since the webs of the carrier bars are relatively thin, the carrier bars are capable of handling more of the different size rows of containers per linear foot of conveyor than is possible with the prior art carriers that are all spaced equal distances apart.

BRIEF DESCRIPTION OF THE DRAWINGS

FIG. 1 is a diagrammatic vertical section taken through a hydrostatic cooker having the multiple pitch conveyor of the present invention associated therewith, the central portion of the carrier bars being cut away.

FIG. 2 is an enlarged perspective of a fragment of the multiple pitch conveyor which also includes chains having adjacent links or different pitch.

FIG. 3 is an enlarged vertical section illustrating the conveyor as it moves rows of containers past the discharge station and past one of the feed stations.

FIG. 4 is an enlarged vertical section of the horizontal run of the conveyor and illustrates the large size range of containers which may be handled by the carrier bars of the multiple pitch conveyor.

FIG. 5 is a section similar to FIG. 3 but illustrates a second embodiment of the invention wherein all links of the chains of the processing conveyor have equal pitch.

FIG. 6 is a section similar to FIG. 4 but illustrates the second embodiment of the invention.

DESCRIPTION OF PREFERRED EMBODIMENT

The multiple pitch processing conveyor 10 (FIGS. 1 and 2) of the present invention is associated with a hydrostatic cooker 12 (FIG. 1) of well known design. The hydrostatic cooker 12 comprises a frame 13 that includes a pair of spaced vertical supporting walls 14 (only one wall being shown in FIG. 1) that are supported in spaced parallel relationship. A housing 16 which extends between the two walls 14 has a rounded upper end 18 and two depending walls 20 and 22 which cooperate with the two walls 14 to define a cooking chamber 24 which is filled with steam at a predetermined cooking pressure and temperature, for example, at about 250° to 275° F and 15 to 20 psi gauge. The lower end of the housing 16 opens into a water filled trough or chamber 26 which is formed by the two walls 14, a transverse horizontal plate 28 and the lower end portions of two transverse vertical walls 30 and 32. The wall 30 cooperates with another transverse vertical wall 34 to define an inlet hydrostatic water leg 36, and the wall 32 cooperates with a transverse vertical wall 38 to provide an outlet hydrostatic leg 40. The hydrostatic legs 36 and 40 communicate with the chamber 26 and are filled with water so as to create sufficient pressure to resist the pressure of steam in the cooking chamber 24. The inlet hydrostatic water leg 36 is thermostatically controlled to provide a gradually increasing water temperature from approximately 210° F at its upper end to approximately the sterilizing temperature in the steam chamber at its lower end. The outlet water leg 40 is also thermostatically controlled to provide a gradually decreasing temperature from approximately the sterilizing temperature at its lower end to any suitable temperature below the boiling point of water, for example 85° F, at its upper end. Steam is added to the water in the hydrostatic inlet water leg 36 to provide the desired temperature therein, and cooling water is directed into the outlet or cooling leg 40 to provide the desired cooling temperature therein. Steam is directed into the cooking chamber 24 by valved conduits 41, and water is directed into the inlet hydrostatic leg 36 and discharge hydrostatic leg 40, as required, by valved conduits 42 and 43, respectively.

Rows of small containers CS and of large containers CL are advanced through the cooker 12 by the multiple pitch processing conveyor 10 which has row accommodating carrier bars 44 and 46 thereon which define small pockets PS on one side of each bar and large pockets PL on the other side of each bar. The distance or pitch between the carriers which define the small pockets PS is designated P1, while the pitch between the carriers which define the large pockets PL is designated P2. The processing conveyor 10 is trained around pairs of sprockets 48 that are rotatably supported near the upper end of the cooker by the vertical walls 14, and the conveyor is further guided through the cooker by cooperating guide rails (not shown) which guide the conveyor 10 in the direction of the arrows around the circuitous path illustrated in center lines in FIG. 1. The conveyor 10 is continuously driven by a motor 52 which is connected to one or more of the pairs of sprockets 48 by a chain drive 54.

The multiple pitch processing conveyor 10 when used in conjunction with a double feed hydrostatic cooker of the type disclosed in the aforementioned Smith et al application and as diagrammatically illustrated in FIG. 1, is also trained around a first pair of small diameter sprockets 56 defining a first feed station FS and a discharge station DS, a pair of large diameter direction changing sprockets 58, and a second pair of small diameter sprockets 60 defining a second feed station FS'. The pairs of sprockets 56, 58 and 60 are journaled on shafts 62, 64 and 66. Rows of large containers CL are formed at the first feed station FS and are deflected into large pockets PL defined by adjacent surfaces of carrier bars 44 and 46, while rows of small containers CS are formed at the second feed station FS' and are deflected into small pockets PS defined by the other surfaces of the carrier bars 44 and 46. After the rows of containers have been processed, they are all discharged at the discharge station DS and, if desired, may be reformed into their original groups of large and small containers by discharge apparatus such as disclosed in the Smith et al. application.

The multiple pitch conveyor 10 (FIGS. 2 to 4) of the first embodiment of the invention comprises a pair of endless chains 70 and 72 each of which is formed by a plurality of short, wide links 74 pivotally connected to long, narrow links 76 by pivot pins 78. Each wide link 74 has a length or pitch equal to the pitch P1 of the small pockets PS which in the preferred embodiment of the invention is 3 ¾ inches long, while the narrow links have a pitch equal to the pitch P2 of the large pockets PL which is 4 ¾ inches long thereby defining a double or multiple pitch conveyor.

The carrier bars 44 are about 7 feet long and include a base flange 80 formed on the inner edge of a web 82. The carrier bars 44 extend between and are connected to inwardly bent tabs 84 of the wide links by bolts 86. As shown in FIGS. 2 and 4, the flange 80 of each carrier bar 44 is connected to the tabs 84, and accordingly, the carrier bars are supported in a cantilever manner.

In order to reduce the localized strain on the base flanges 80, which flanges tend to break after prolonged use, cantilever load relieving brackets 88 are also connected to the tabs 84 by the bolts 86. Each bracket 88 includes a flange 90 which is clamped between the carrier flange and tab by the bolt 86. The flange 90 is formed integrally with a wide supporting arm 92 and with an angle portion 94 which is slotted to receive the web 82 of the carrier bar 44 adjacent its free edge thereby relieving substantially all the cantilever force acting upon the base flange 80 of each carrier 44. The carrier bars 46 include base flanges 96 (FIG. 4) and webs 98 and are mounted to tabs 100 on the narrow links 76 by bolts 102 and cooperating load relieving brackets 104 in a manner similar to the manner of mounting the carrier bars 46.

As best shown in FIGS. 2 and 4, each pair of carrier bars 44 and 46 have dual retaining flanges 110 and 112, respectively, formed on the free or outer end of their webs 82 and 98, respectively. The dual retaining flange 110 of each carrier bar 44 includes a small pocket flange 110a which projects toward the carrier bar 46 that is closest thereto, i.e., which is spaced therefrom a distance substantially equal to the length of the smallest pitch P1. The dual retaining flange 110 on each carrier 44 also includes a large pocket flange 110b which is spaced outwardly of the flange 110a and is directed in the opposite direction toward the adjacent carrier 46 which is spaced a distance equal to the pitch P2 from the associated carrier. The dual retaining flanges 112 of the carrier bars 46 are similar to the flanges 110 and each remaining flange 112 includes a small pocket flange 112a directed toward the carrier 44 spaced therefrom a distance equal to pitch P1, and a large pocket flange 112b directed toward the carrier 44 spaced therefrom a distance equal to the pitch P2.

As indicated in FIG. 3, when the multiple pitch processing conveyor 10 moves around small diameter sprockets 56 at the feed station FS and discharge station DS, the dual retaining flanges 110 and 112 separate a sufficient distance to receive rows of large containers CL at the feed station FS and to discharge the rows of large containers CL and also the rows of small containers CS at the discharge station DS. The small containers CS are similarly fed into the small pockets PS at the feed station FS', and an arcuate guide plate 115 is positioned to prevent discharge of the rows of large containers CL therefrom. It will be noted that the teeth of the sprockets 56, as well as the other sprockets around which chains 70 and 72 are trained, are designed to handle the double pitch chains of the first embodiment and that one edge of the base flange 80 of each carrier 44 is foreshortened at 116 (FIG. 3) to preclude mechanical interference. It will further be noted that the webs 82 and 98 of the carrier bars need not be centered between adjacent pivot pins 78 but instead are all spaced a predetermined distance forward of the next following pivot pin 78. It will also be apparent from FIG. 4 that the web of the central carrier bar of any three adjacent carrier bars is offset a distance D from the midplane M between the webs of the two outer carrier bars thereby providing a large pocket PL on one side of the web of the central carrier bar and a small pocket PS on the other side.

In the preferred embodiment of the invention the webs 82 and 98 are about 3/16 inches thick and are spaced about 2 ⅛ inches forward of the next following pivot pins 78. The radius of the pairs of sprockets 56 and 60 at the feed and discharge stations are about 11 ⅛ inches D, and the lower loops 118 (FIG. 1) of the conveyor 10 are not less than 28 inches D. The small pitch P1 is 3 ¾ inches long and the large pitch P2 is 4 ¾ inches long. The distance between the base flange 80 and the small pocket flange 100a is 3 ⅜ inches and the distance between the base flange 80 and the large pocket flange 100b is 4 ¾ inches. A conveyor having such dimensions will receive and discharge a size range of small containers CS which vary in diameter from 2 11/16 inches D to 3 3/16 inches D, and will confine the containers within the small pockets PS during their passage through the several processing chambers of the cooker. The conveyor 10 will also accommodate large containers CL which lie in a size range of 3 inches D to 4 ½ inches D and will confine these containers within the large pockets PL during their travel through the cooker.

In operation, rows of large diameter containers CL are fed into the large pockets PL at the feed station FS, and rows of small containers CS are fed into the small pockets PS at feed station FS, the large containers CL being retained in their pockets PL by the guide plate 115. The rows of large and small containers are advanced by the continuously driven processing conveyor 10 through the inlet leg 36, steam chamber 24, and discharge leg 40 of the cooker 12 during which time the food product within the hermetically sealed containers are processed. The rows of processed containers are then returned to the discharge station DS and all rows of processed containers CL and CS are discharged from the cooker.

The multiple pitch conveyor 10c (FIGS. 5 and 6) of the second embodiment of the invention is substantially the same as that of the first embodiment of the invention. Accordingly, equivalent parts of the second embodiment will be assigned the same numerals as the first embodiment followed by the letter "c," and only the parts that differ will be described.

The conveyor 10c is substantially the same as the conveyor 10 except that the two chains 120 are defined by narrow links 122 and wide links 124 all having the same pitch Pc. The several pairs of sprockets, including sprockets 56c, over which the chains 120 are trained are provided with standard type sprockets having equally spaced teeth. The chain pitch Pc is equal to the sum of the several pitches of the conveyor divided by the number of different pitches. Thus, in the double pitch conveyor illustrated in FIGS. 5 and 6, the pitch Pc will be equal to one-half of the sum of the pitches P1c and P2c. It will also be noted that the web 82c or 98c of the central carrier bar 44c or 46c of any three adjacent carrier bars is offset a distance Oc from the midplane Mc between the webs of the two adjacent outer carrier bars thereby providing a large pocket PLc on one side of the web of the central carrier bar and a small pocket PSc on the other side of the web.

Although the multiple pitch conveyor 10 as illustrated in the two embodiments of the invention have only two different pitches, it will be understood that if it is desired to simultaneously process additional size ranges of containers; that additional pitches may be used, that the carrier bars may be adapted to handle these additional size ranges of containers, and that additional feed stations may be added to the cooker so as to handle each size range of containers.

From the foregoing description it will be apparent that the multiple pitch processing conveyor of the present invention includes adjacent carrier bars that are spaced different distances apart, and include relatively thin walled webs which will receive rows of containers of one size range on one side thereof and rows of containers of another size range on the other side thereof thus adapting the conveyor to handle at least two different size ranges of containers. The arrangement is such that the carriers will themselves confine the containers therein while passing through the different processing chambers of the cooker. The conveyor will also maintain maximum container density per running foot of conveyor.

Although the best mode contemplated for carrying out the present invention has been herein shown and described, it will be apparent that modification and variation may be made without departing from what is regarded to be the subject matter of the invention.

What is claimed is:

1. A conveyor for a cooker or the like for simultaneously handling rows of cylindrical containers of various size ranges comprising a pair of endless chains, means moving said chains along a predetermined path past feed means and discharge means, each chain comprising by first and second articulating links pivotally connected together by pivot pins; first carrier bars extending between and connected to associated ones of said first links of each chain, second carrier bars extending between and connected to associated second links on the two chains, each carrier bar including a base flange mounting a container separating web, said web terminating in opposed dual container flange means; the improvement wherein the web on each carrier bar is spaced from the web of the next adjacent carrier bar on one side thereof by a first pitch slightly larger than the largest container in a first size range of containers to be handled, and spaced from the web of the carrier bar on the other side thereof by a second pitch slightly larger than the largest container in a second size range of containers to be handled; each dual retaining flange having a first retaining portion directed toward the web that is spaced therefrom a distance substantially equal to said first pitch and also spaced from its associated base flange a distance substantially equal to the largest diameter of the first size range of containers, and having a second retaining portion directed toward the web that is spaced therefrom a distance substantially equal to said second pitch and also spaced from its associated base flange a distance substantially equal to the largest diameter container of said second size range of containers.

2. A conveyor according to claim 1 wherein the distance between the axes of the pivot pins associated with said first links is equal to said first pitch, and wherein the distance between the axes of the pivot pins associated with the second links is equal to said second pitch.

3. An apparatus according to claim 1 wherein two feed means are provided, wherein means are provided for guiding the conveyor around a small diameter curve adjacent each of said feed means to cause said first and second dual retaining flanges to separate sufficiently to receive rows of containers therebetween, one of said feed means being adapted to deflect rows of containers of one size range on one side of each first carrier bar, and said other feed means being adapted to deflect rows of containers of another size range on the other side of each first carrier bar.

4. An apparatus according to claim 1 wherein said first and second webs are each spaced the same distance from one of their adjacent pivot pins.

5. An apparatus according to claim 1 wherein said first means deflects rows of containers of a size slightly smaller than said small pitch on said one side of the web of each carrier bar and deflects rows of containers of a size slightly smaller than said large pitch on the other side of the web of each carrier bar, and wherein the webs of the carrier bars are thin walled so that said conveyor will support a maximum density of rows of different size containers per linear foot of conveyor.

6. An apparatus according to claim 3 wherein said feed means deflects rows of containers of a size slightly smaller than said small pitch on one side of the web of each carrier bar and deflects rows of containers of a size slightly smaller than said large pitch on the other side of the web of each carrier bar, and wherein the webs of the carrier bars are thin walled so that said conveyor will support a maximum density of rows of different size containers per linear foot of conveyor.

7. An apparatus according to claim 3 wherein two feed means are provided, wherein means are provided for guiding the conveyor around a small diameter curve adjacent each of said feed means to cause said first and second dual retaining flanges to separate from each other a distance sufficient to receive rows of containers therebetween, one of said feed means being arranged to deflect one size of containers onto said first ones of said carrier bars, and the other of said feed means being provided to feed the other size containers onto said second carrier bars.

8. An apparatus according to claim 7 wherein all of said rows of containers are discharged at a discharge station at one of said small diameter curved portions of the conveyor.

9. A conveyor for a cooker or the like for simultaneously handling rows of cylindrical containers of various size ranges comprising a pair of endless chains, means moving said chains along a predetermined path past feed means and discharge means, each chain comprising first and second articulating links pivotally connected together by pivot pins, carrier bars extending between said first and second links of each chain, said carrier each having a container separating web projecting from a base flange and terminating in oppositely extending container retaining flanges, the improvement wherein the spacings between successive pairs of cooperating webs are substantially different, the container retaining flanges for the larger of said web spacings being outwardly offset from the associated base flanges by a greater distance than are the corresponding container retaining flanges for the smaller of said web spacings.

10. A conveyor according to claim 15, wherein the pitch of the links mounting the more widely spaced carriers is greater than the pitch of the links mounting the more closely spaced carriers.

11. A conveyor according to claim 15 wherein said first and second links all have the same pitch.

12. A conveyor according to claim 11 wherein the pitch of each of said links is equal to the sum of the several pitches of the conveyor pockets divided by the number of different pocket pitches.

13. A conveyor for a cooker or the like for simultaneously handling rows of cylindrical containers of various size ranges comprising a pair of endless chains, means moving said chains along a predetermined path past feed means and discharge means, each chain comprising first and second articulating links pivotally connected together by pivot pins, first carrier bars extending between and connected to associated ones of said first links of each chain, and second carrier bars extending between and connected to associated second links of the two chains, each carrier bar including a container separating web; the improvement wherein each web is offset from the midplane between adjacent webs to provide large and small container receiving pockets, a base flange on the inner end of each of said webs, and oppositely projecting container retaining flanges on the outer end of each web, the container retaining flanges for said small pockets being closer to their base flanges than are the container retaining flanges for said large pockets.

* * * * *

UNITED STATES PATENT OFFICE
CERTIFICATE OF CORRECTION

Patent No. 3,709,352          Dated January 9, 1973

Inventor(s) JAMES L. REIMERS et al

It is certified that error appears in the above-identified patent and that said Letters Patent are hereby corrected as shown below:

Column 8, line 17, change "15" to --9--.

Column 8, line 21, change "15" to --9--.

Signed and sealed this 13th day of August 1974.

(SEAL)
Attest:

McCOY M. GIBSON, JR.
Attesting Officer

C. MARSHALL DANN
Commissioner of Patents